(12) United States Patent
Heath et al.

(10) Patent No.: US 7,603,752 B2
(45) Date of Patent: Oct. 20, 2009

(54) COMPRESSION OR EXPANSION MOUNTABLE SUPPORT BAND

(75) Inventors: Dale R Heath, Keller, TX (US); Allen Willis, Fort Worth, TX (US); Kevin Paswalk, Watauga, TX (US); Arthur C Gagnon, Wolcott, CT (US)

(73) Assignee: Andrew LLC, Hickory, NC (US)

( * ) Notice: Subject to any disclaimer, the term of this patent is extended or adjusted under 35 U.S.C. 154(b) by 379 days.

(21) Appl. No.: 11/307,418

(22) Filed: Feb. 6, 2006

(65) Prior Publication Data

US 2007/0180662 A1     Aug. 9, 2007

(51) Int. Cl.
F16B 33/00     (2006.01)

(52) U.S. Cl. .............................. 24/25; 24/268; 24/278; 24/20 R; 285/421

(58) Field of Classification Search ............ 24/19, 24/25, 268, 270, 277, 274 R, 279, 284, 278, 24/20 R; 277/576, 602, 606, 607, 616; 285/214, 285/230, 236, 237, 420, 421, 370, 397, 406; 404/25, 26; 403/235, 236, 292, 297, 298, 403/309, 313, 355, 356, 373
See application file for complete search history.

(56) References Cited

U.S. PATENT DOCUMENTS

| | | |
|---|---|---|
| 2,627,635 A | 2/1953 | Seltzer |
| 2,650,115 A | 8/1953 | Taylor |
| 2,692,417 A | 10/1954 | Primich |
| 2,778,085 A | 1/1957 | Bernard |
| 2,803,866 A | 8/1957 | Flora |
| 2,922,212 A | 1/1960 | Textrom |
| 3,516,446 A | 6/1970 | O'Hargan et al |
| 4,281,944 A * | 8/1981 | Bowman ................. 404/26 |
| 4,478,437 A | 10/1984 | Skinner |
| 4,681,353 A | 7/1987 | Halling |
| 4,715,626 A | 12/1987 | Gehring et al. |
| 4,872,780 A * | 10/1989 | Bowman ................. 404/26 |
| 4,878,326 A | 11/1989 | Sass |
| 4,890,863 A | 1/1990 | Westhoff et al. |
| 4,903,970 A | 2/1990 | Ditcher et al. |
| 4,927,189 A | 5/1990 | Burkit |
| 5,044,822 A * | 9/1991 | Moss ..................... 405/52 |
| 5,150,927 A | 9/1992 | Skinner |
| 5,185,908 A | 2/1993 | Oetiker |
| 5,209,601 A | 5/1993 | Odill et al. |
| 5,316,407 A * | 5/1994 | Miller .................... 404/25 |
| 5,431,459 A | 7/1995 | Gundy |
| 5,474,396 A * | 12/1995 | Bravo .................... 404/26 |
| 5,496,128 A | 3/1996 | Odill |
| 5,752,296 A | 5/1998 | Chaput et al. |
| 6,543,095 B2 | 4/2003 | Sedlmeier |
| 6,607,219 B2 * | 8/2003 | Mirales et al. ............ 277/576 |
| 6,805,359 B2 * | 10/2004 | Neuhaus et al. ........... 277/576 |

(Continued)

Primary Examiner—Robert J Sandy
(74) Attorney, Agent, or Firm—Babcock IP, PLLC

(57) ABSTRACT

A support band having at least one band segment, a first connection end and a second connection end. The first and second connection end(s) each having a mounting surface with a wedge end, a wedge surface extending from the wedge end forming an acute angle with respect to the mounting surface, and a stand-off surface between the mounting surface and proximate a distal end of the wedge surface. The first and second connection end mounting surface(s) coupled to the at least one band segment. The support band having mounting means for mounting on and or within a structure via compression and or expansion.

13 Claims, 7 Drawing Sheets

U.S. PATENT DOCUMENTS

| | | | |
|---|---|---|---|
| 7,146,689 B2 * | 12/2006 | Neuhaus et al. | 24/279 |
| 7,263,746 B2 * | 9/2007 | Neuhaus et al. | 24/279 |
| 7,364,323 B2 * | 4/2008 | Francois | 362/267 |
| 2002/0140224 A1 * | 10/2002 | Brockway | 285/189 |

* cited by examiner

COMPRESSION OR EXPANSION MOUNTABLE SUPPORT BAND

BACKGROUND

1. Field of the Invention

This invention relates to a support band and more particularly to a support band mountable either around the outer surface of a structure via compression or within a generally cylindrical space via expansion.

2. Description of Related Art

Support bands are used in many applications to provide a quickly applied connection and or support point upon a structure, without requiring multiple penetrations and or degradation of the structure surface.

Support bands are used, for example, to provide mounting points for signal and power cables coupled to antennas or other equipment installed on pre-existing polygonal or circular structures such as monopoles, bill board legs, telephone or light poles, chimneys, water or radio towers and the like. Compression connections are made around the outside of the structure and expansion connections are made within the structure, for example within a support/access tube or a decommissioned chimney flue. A single support band can provide a quick connection point for several cables or other devices when the support band is provided with quick connect mounting points such as holes spaced away from the band that receive snap-in clips or other mounting hardware. Mounting additional quick connect mounting points to existing support bands often requires duplicating and or replacing the entire support band, which is complicated by the presence of any existing cables.

Prior support bands, dedicated only to one of expansion or compression installation, have been supplied pre-sized for narrow ranges of specific circumferential dimensions, requiring the manufacture and inventory of a large number of different sized models. To provide the necessary strength at the right angle bent connection ends, the entire band is typically formed from heavy and relatively expensive quarter inch rolled steel. Also, larger circumferential dimensions result in a large band that is difficult to package, warehouse and deliver. Alternatively, support bands of universal dimensions may be fabricated at the point of use from coils of steel band, cable or chain. However, the onsite fabrication procedures significantly increase installation time and require specialized tools and training for installation personnel. Also, installation personnel are exposed to additional drop hazards when extended fabrication and installation procedures are performed high atop a structure.

Competition within the support band market has focused attention on ease of installation, including elimination of specialized installation tooling and drop hazard reduction. Further, overall weight, delivery packaging requirements and materials and manufacturing cost reductions are significant factors for commercial success.

Therefore, it is an object of the invention to provide an apparatus that overcomes deficiencies in the prior art.

BRIEF DESCRIPTION OF THE DRAWINGS

The accompanying drawings, which are incorporated in and constitute a part of this specification, illustrate embodiments of the invention, and together with a general description of the invention given above, and the detailed description of the embodiments given below, serve to explain the principles of the invention.

DETAILED DESCRIPTION

Figure 1:
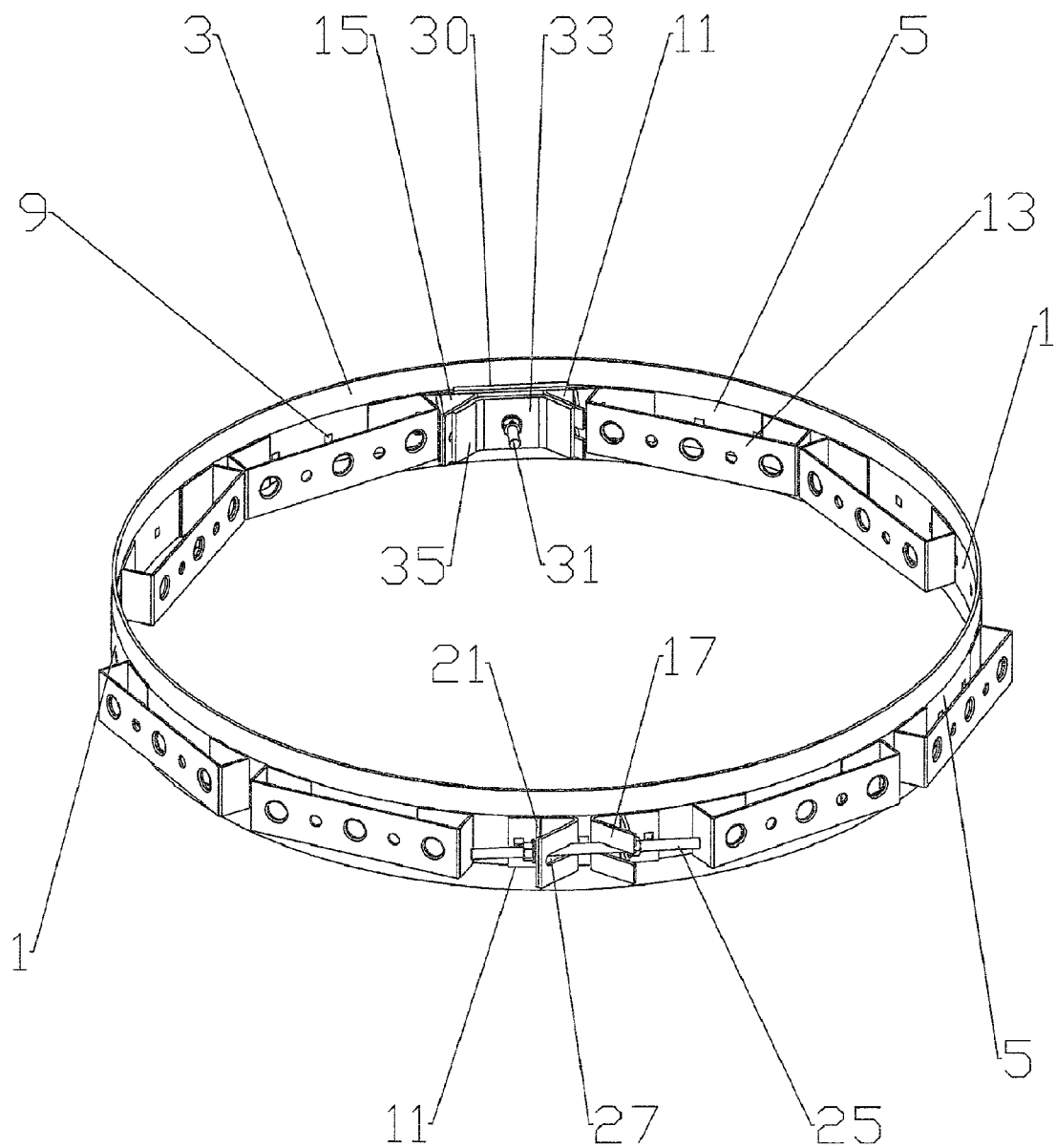
FIG. 1 is an isometric view of a pair of two exemplary support bands according to the invention, installed upon a structure. one support band is applied in a compression configuration around the outside of the structure and one support band is applied in an expansion configuration along the inside of the structure.

As shown in FIG. 1, an exemplary embodiment of a support band 1 according to the invention may be applied either around the outside of a structure 3 in a compression configuration or along the inside of the structure in an expansion configuration.

Figure 2:
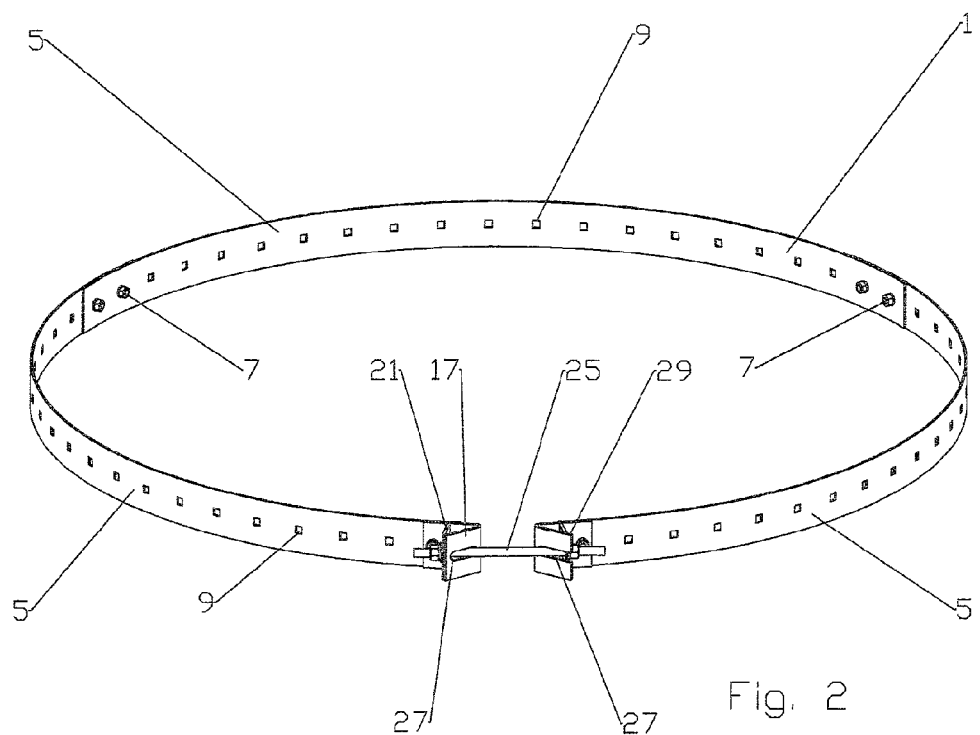
FIG. 2 is an isometric view of an exemplary support band in a compression configuration utilizing three band segments.
Figure 3:
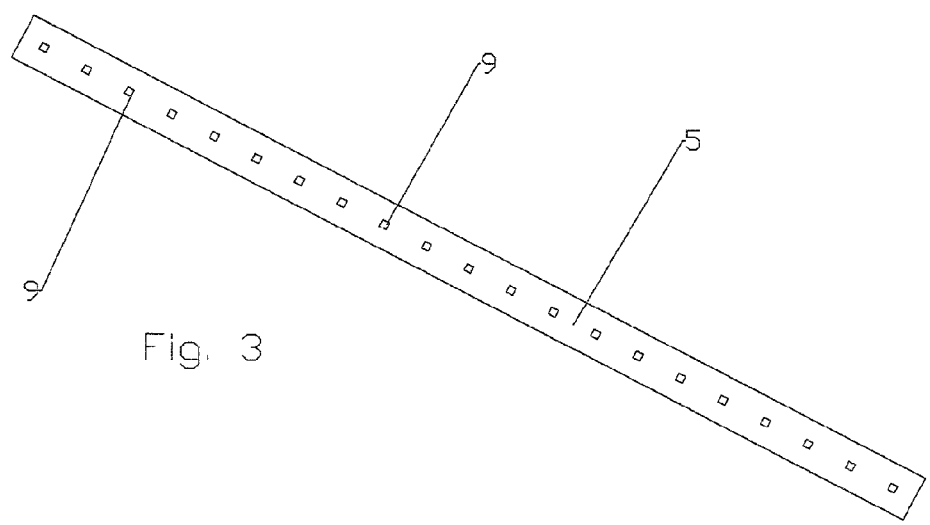
FIG. 3. is a schematic top view of a band segment of the support band(s) of FIG. 1.

The support band 1 has one or more band segment(s) 5, as shown in FIGS. 2 and 3, that may be linked one to another by fastener(s) 7 such as a nut and bolt to adapt the support band to the desired structure 3 circumference. A plurality of hole(s) 9 may be pre-formed in the band segment(s) 5 to enable easy connection of quick connect hanger bracket(s) 13 or other desired connections by fastener(s) 7. To obtain a specific desired support band 1 length, a band segment 5 may be effectively shortened by attaching it to the adjacent band segment(s) 5 through one of the plurality of hole(s) 9 along the length of the band segment 5, overlapping a portion of the band segment(s) 5. Preferably, the band segment(s) 5 are formed from a cost effective lightweight material with sufficient tension and compression strength, such as an aluminum alloy. Applying aluminum as the band segment 5 material also reduces the overall weight of the support band 1, easing transport up the structure 3 and reducing the overall weight added to the structure 3, upon installation. Also, aluminum is desirable because it will easily bend to conform to corners of a polygonal structure 3 as well as slightly deform into close contact if the structure 3 is tapered end to end.

As shown in FIGS. 4-7, first and second connection end(s) 11 may be attached to the desired length of band segment(s) by a fastener(s) 7. The connection end(s) 11 are formed with a mounting surface 15 for coupling to the band segment 5 ends. A wedge surface 17 extends from a wedge end 19 of the mounting surface 15 at an acute angle over the mounting surface 15. A stand-off surface 21 extends from the mounting surface 15 to proximate the distal end 23 of the wedge surface 17 to form a preferably right triangle shaped wedge.

In the exemplary embodiment(s), the stand-off surface 21 is demonstrated as a separate piece mounted, for example via welding. One skilled in the art will appreciate that the mounting surface 15, wedge surface 17 and stand-off surface 21 may be formed from a single contiguous metal blank that is bent into the triangle shaped form and a single, for example via welding, connection applied between the mounting surface 15 and the stand-off surface 21. Alternatively, a connection end 11 may be machined from a solid blank or formed for example by casting or metal molding. Similarly, the fastener(s) 7 described herein generally as nuts and bolts may be any form of secure interconnection such as rivets, hooks, snaps, latches, tabs, pins or the like.

Figure 4:
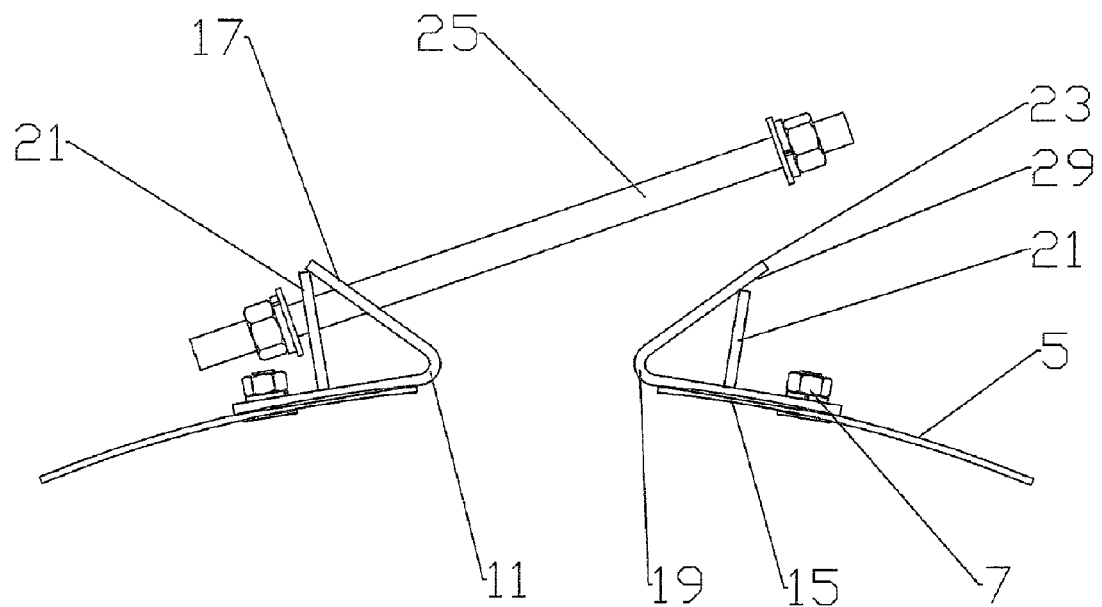
FIG. 4 is a schematic side view of the connection ends in a compression configuration, with the compression member disconnected.
Figure 5:
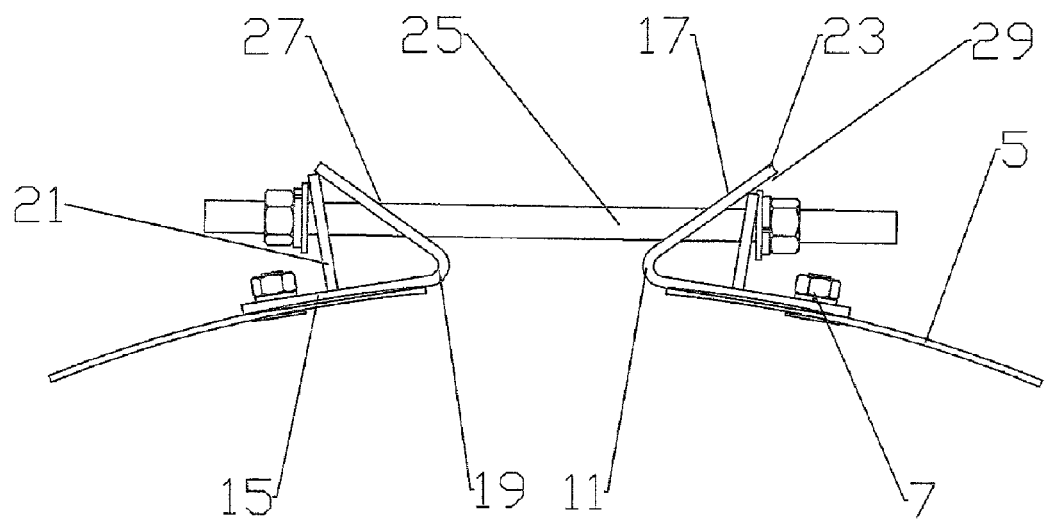
FIG. 5 is a schematic side view of the connection ends in a compression configuration, with the compression member connected.

In a compression configuration, as best shown for example in FIGS. 4 and 5, a compression member 25 such as a threaded rod, bolt or the like extends between the first and second connection end(s) 11 pulling the connection end(s) 11 towards one another. The compression member 25 passes through compression hole(s) 27 formed in the stand-off surface 21 and wedge surface 17. To allow a range of angles between the adjacent connection end(s) 11 resulting from the diameter of the desired structure 3, the compression hole(s) 27 may be elongated. For ease of assembly, the compression hole(s) 27 on one or both of the connection end(s) 11 may be formed as slots open to the edge between the wedge surface 17 and the stand-off surface 21. A short portion at the distal end 23 of the wedge surface 17 may extend beyond the intersection with the stand-off surface 21 to form a retaining projection 29. The retaining projection 29 operates to loosely retain the compression member 25 between the bottom of the compression hole (slot) 27 and the retaining projection 29 once it is slung down through the compression hole (slot) 27.

Figure 6:
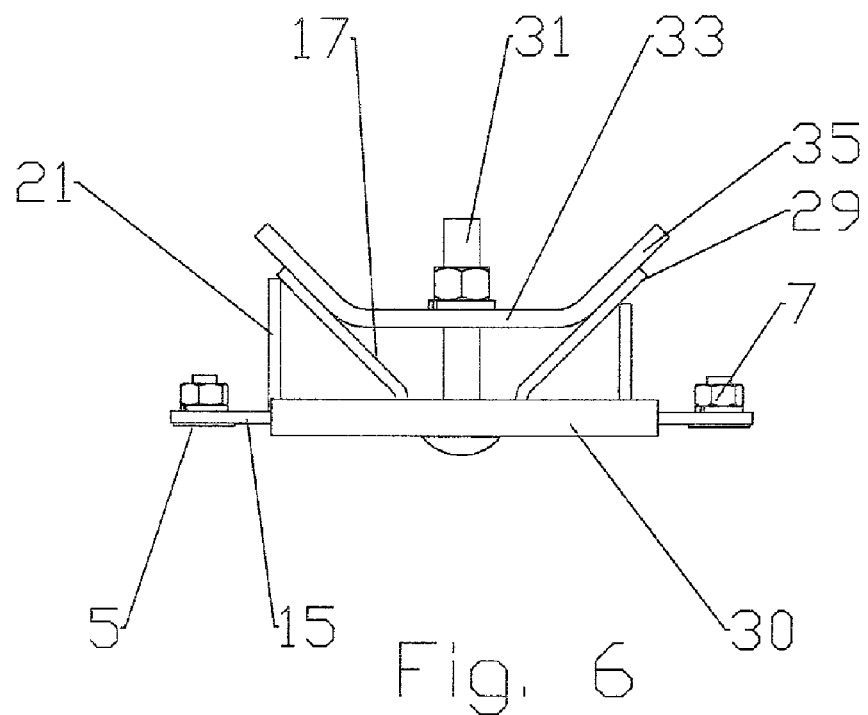
FIG. 6 is a schematic side view of the connection ends in an expansion configuration, with the wedge member ready to expand the support band.
Figure 7:
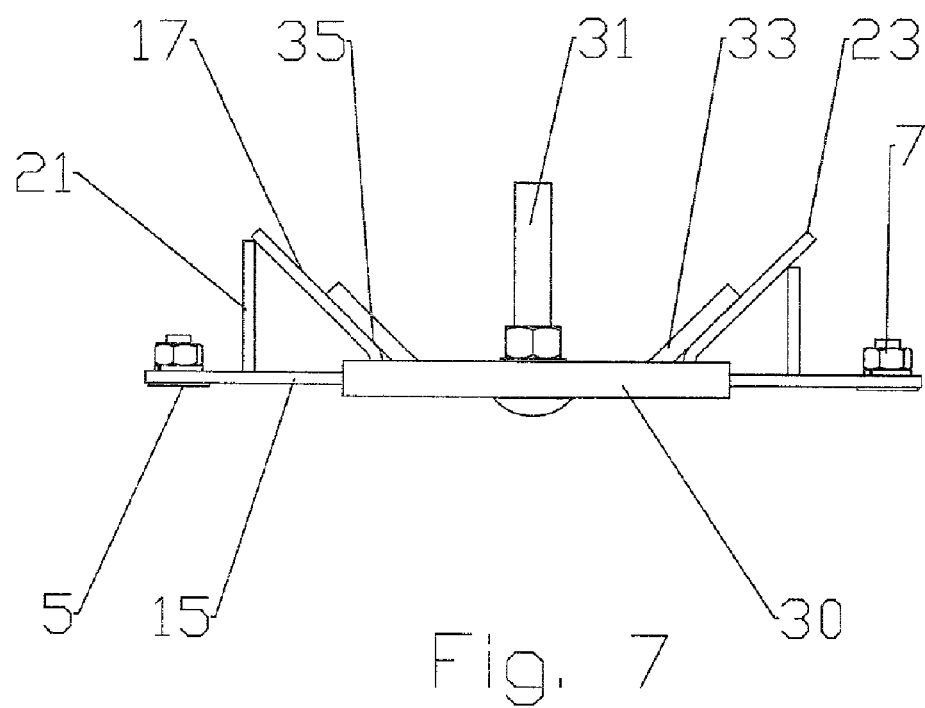
FIG. 7 is a schematic side view of the connection ends in an expansion configuration, with the wedge member fully expanding the support band.

In an expansion configuration, as best shown for example in FIGS. 6-7, a support plate 30 is positioned under adjacent connection end(s) 11. To bias the adjacent connection end(s) 11 apart to form the expansion connection, an adjustable fastener 31 such as a bolt or threaded rod extending from the support plate 30 passes through a wedge member 33 and is drawn toward the support plate by tightening of the adjustable fastener 31. As the wedge member 33 is drawn toward the support plate 30, wedge portion(s) 35 of the wedge member 33 engage the wedge surface(s) 17 of each connection end 11, pushing the connection end(s) 11 apart.

The wedge member 33 is demonstrated as a plate with angled edge(s) at either side forming the wedge portion(s) 35. Alternatively, the wedge member 33 may be formed as a solid block with angled edge faces that form the wedge portion(s) 35. Preferably, the wedge portion(s) 35 are angled to mate with the wedge surface(s) 17 so that the expansion force transmitted across the mating surfaces is uniform. Upturned guide edge(s) 37 may be applied to the support plate 30 to act as guides for the connection end(s) 11 to prevent skewing of the wedge member 33 and or connection end(s) 11 as the wedge member 33 is drawn towards the support plate 30.

A compression or expansion mountable support band kit according to the invention may include a plurality of band segment(s) 5, quick connect hanger bracket(s) 13 and fastener(s) 7; two connection end(s) 11, a compression member 25, a wedge member, adjustable fastener 31 and a support plate 30. Where five forty-two inch long band segments are supplied, the invention may be applied in a compression or expansion configuration to most structure(s) having a circumference of between ten and sixty inches. Because the kit has a plurality of relatively short, stackable and flat band segments, the kit is compact, enabling significant improvements in packaging and delivery efficiencies.

Figure 8:
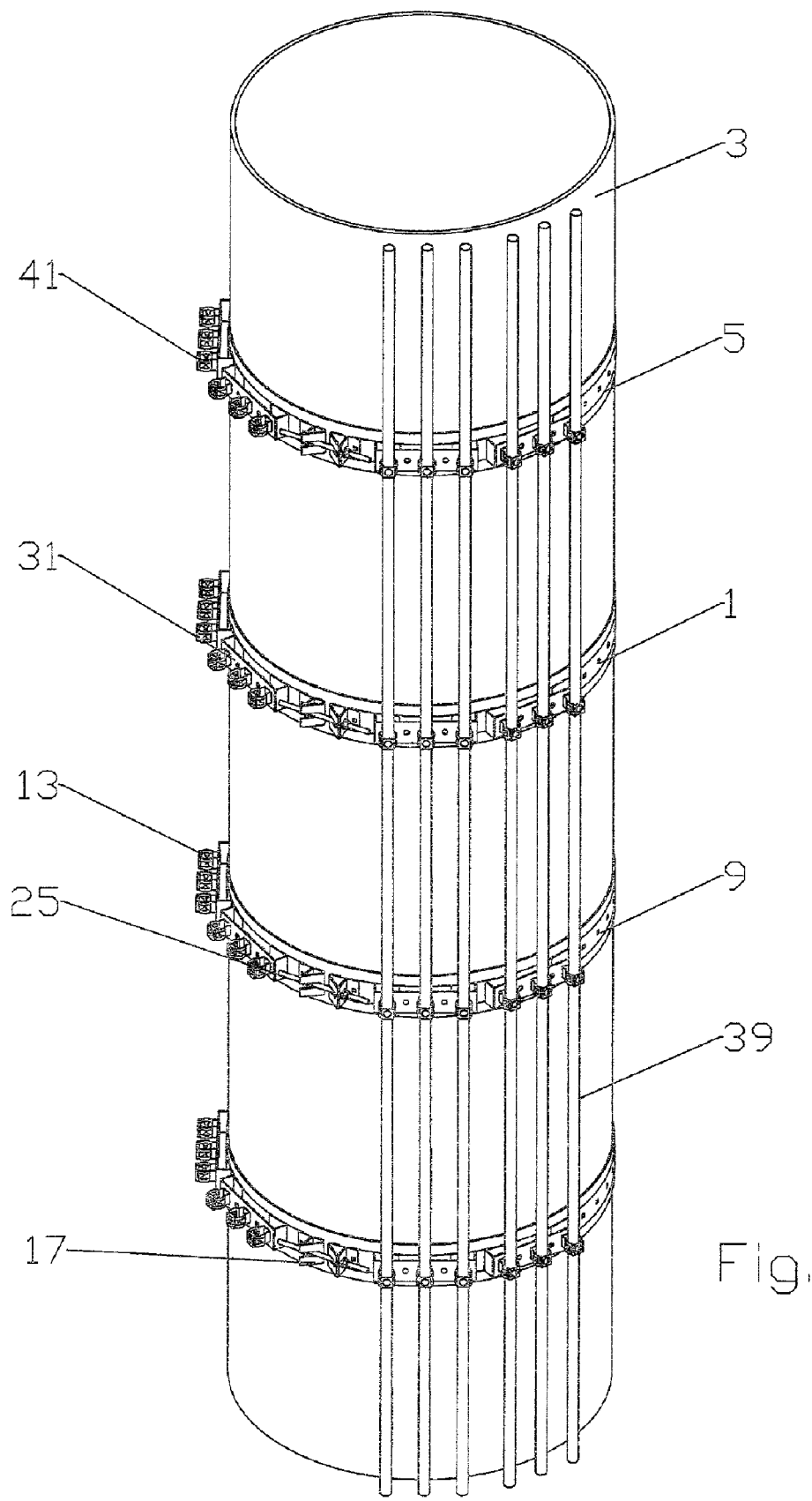
FIG. 8 is an isometric view of several support bands mounted on a cylindrical structure in a compression configuration.
Figure 9:
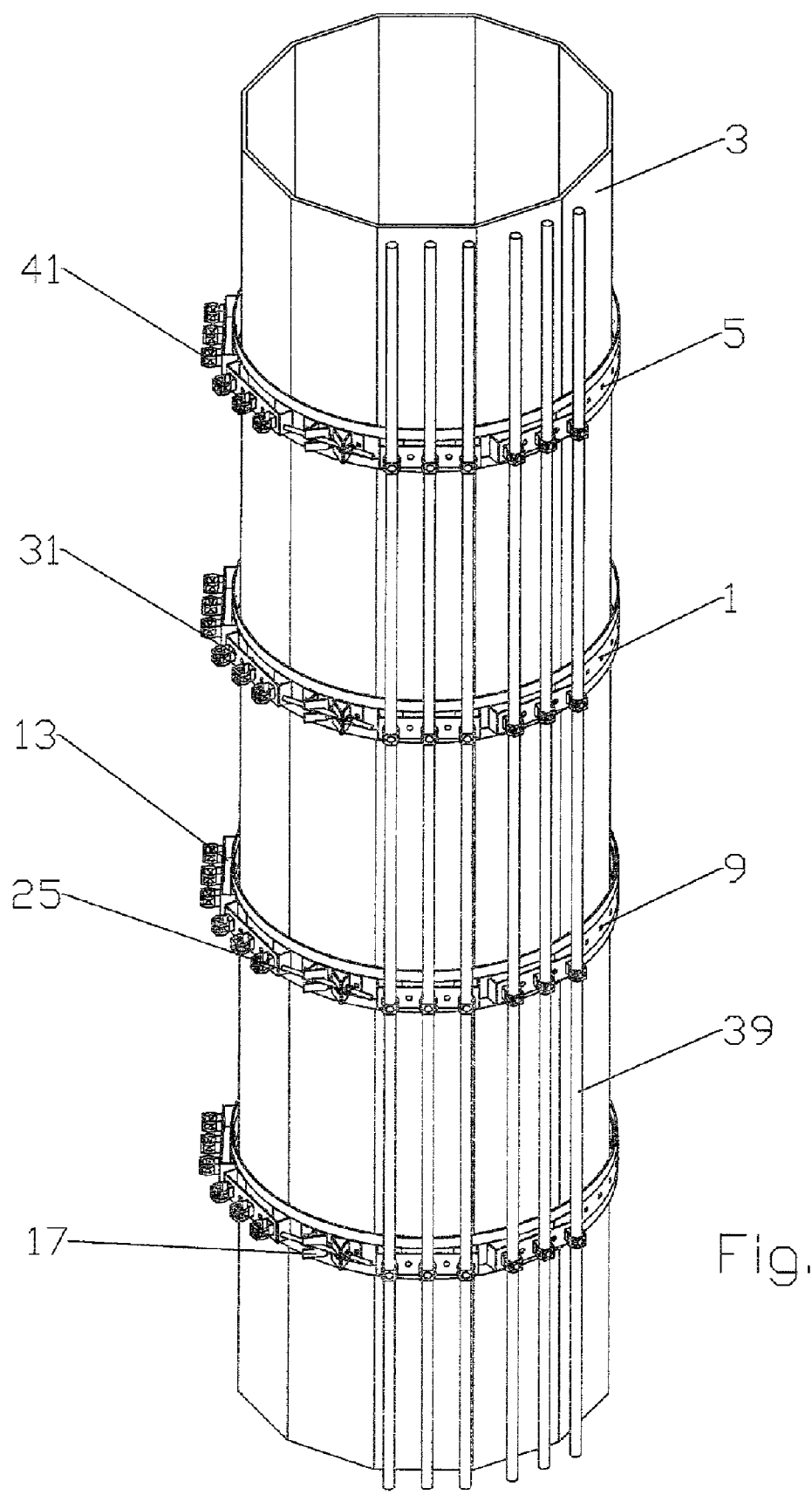
FIG. 9 is an isometric view of several support bands mounted on a polygonal structure in a compression configuration.

To install a support band 1 in a compression configuration, for example as shown in FIGS. 8 and 9, the outer circumference of the structure 3 at the desired mounting point is measured and a corresponding number of band segment(s) 5 joined end to end. To obtain a precise length, one of the band segment(s) 5 may be attached via a mid length hole 9, overlapping a portion of the band segment 5. The connection end(s) 11 are then attached to the band segment(s) 5 and the compression member 25 placed through the compression hole(s) 27 of at least one connection end 11. One or more of the quick connect hanger bracket(s) 13 may also be connected via fastener(s) 7 at any desired location(s) around the band segment(s) 5 with respect to the position of the connection end(s) 11. The pre-assembled support band 1 may then be carried up to the desired mounting point on the structure 3 as a unitary assembly with minimal drop hazard.

The support band 1 is then slung around the structure 3 at the desired installation location and the compression member 25 coupled between the two connection point(s) 11. Where one of the connection point(s) 11 has the compression hole(s) 27 in the form of slots extending from the edge between the stand-off surface 21 and wedge surface 17, coupling the compression member 25 between the two connection end(s) 11 may be easily performed by a single installer by simply swinging the compression member 25 down into the compression hole (slot) 27. The compression member 25 is then tightened against the opposing stand-off surface(s) 21 of the connection end(s) 11 until the desired level of compression is reached, securely mounting the support band 1 to the structure 3. Once the support band 1 is secured, cable(s) 39 and or other apparatus may be secured via snap-in connection(s) 41 or the like.

Figure 10:
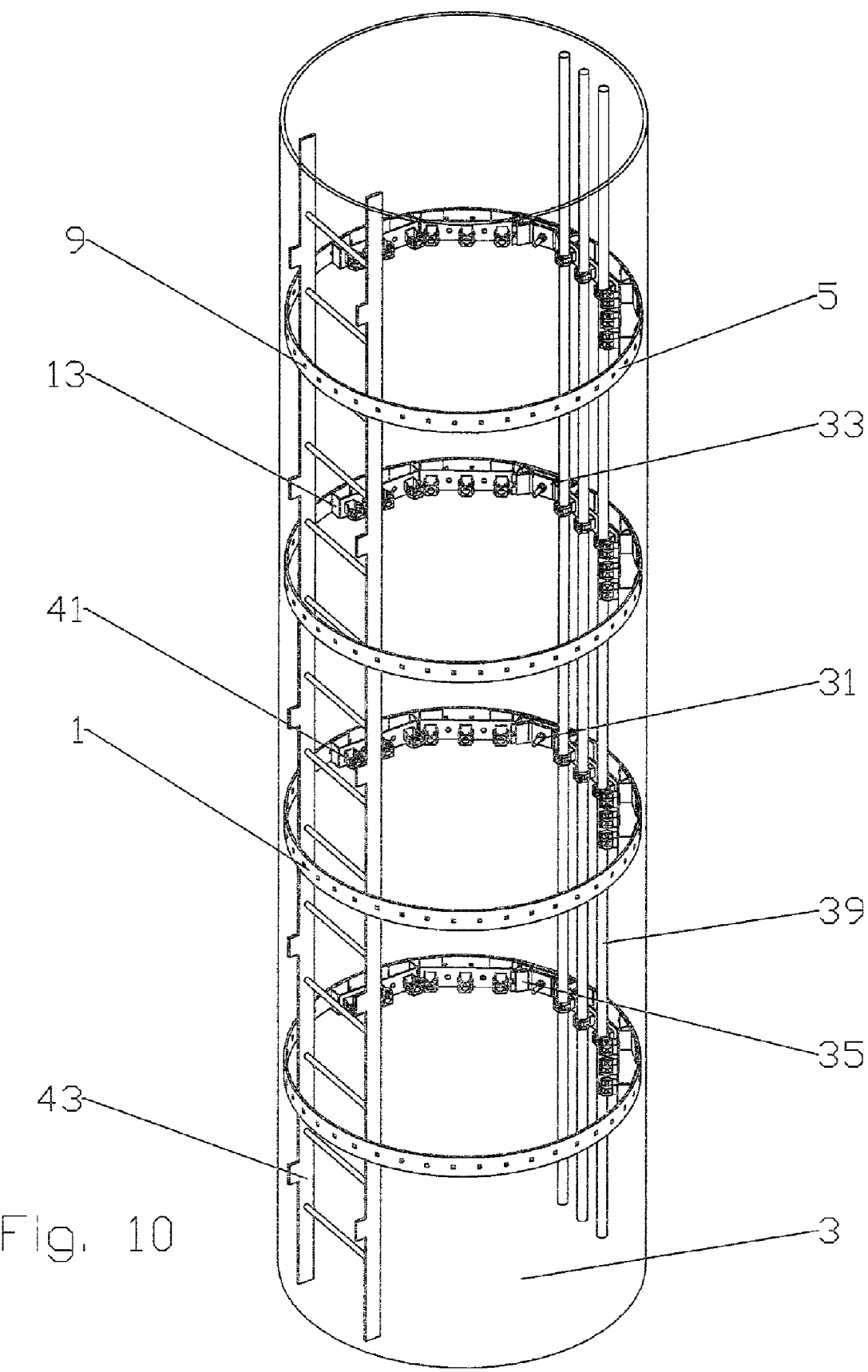
FIG. 10 is an isometric view of several support bands mounted inside a cylindrical structure, in an expansion configuration. The structure is shown as transparent for clarity.

For an expansion installation, as shown for example in FIG. 10, the support band(s) 1 are pre-assembled as described with respect to a compression installation, except the support band 1 is sized with respect to an internal circumference of the structure 3 and the compression member 25 is not applied. At the desired installation point within the structure 3, the support band 1 is held in place and the support plate 30 and wedge member 33 applied. Tightening the adjustable fastener 31 between the wedge member 33 and the support plate 30 forces the connection point(s) 11 apart, expanding the support band 1 until it is securely mounted against the structure 3 sidewall. Because expansion installations often are performed in confined space areas with pre-existing wall connections such as access ladders 43, cables and or process piping, the multiple portion configuration of the band segment(s) 5 eases problems that may otherwise arise with the feeding of the support band 1 behind obstructions for mounting flush to the structure 3 sidewall, and or the temporary removal of a portion of an installed support band 1 to facilitate adding more mounting points, such as an additional quick connect hanger bracket 13.

One skilled in the art will appreciate that the generally right triangle configuration of the connection end(s) 11 enhances the strength of the support band 1 in a compression configuration, enabling the application of the lighter, bendable aluminum band segment(s) 5. At the same time, the generally right triangle configuration provides the wedge surface(s) 17 for the wedge member 33 to act upon when an expansion configuration is desired. The kit according to the invention eliminates the prior need for heavy, multiple support bands each manufactured to a specific dimension without the significant increases in installation time and or specialized tooling/training requirements associated with prior onsite fabrication of support bands from bulk coiled material.

Finally, one skilled in the art will recognize that the present invention is not limited to use with the described electrical cabling and or antenna applications. The present invention may serve as a mounting point for any number of other assemblies and or apparatus.

TABLE OF PARTS

| | |
|---|---|
| 1 | support band |
| 3 | structure |
| 5 | band segment |
| 7 | fastener |
| 9 | hole |
| 11 | connection end |
| 13 | quick connect hanger bracket |
| 15 | mounting surface |
| 17 | wedge surface |
| 19 | wedge end |
| 21 | stand-off surface |
| 23 | distal end |
| 25 | compression member |
| 27 | compression hole |
| 29 | retaining projection |
| 30 | support plate |
| 31 | adjustable fastener |
| 33 | wedge member |
| 35 | wedge portion |
| 37 | guide edge |
| 39 | cable |
| 41 | snap-in connection |
| 43 | access ladder |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable details, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

What is claimed is:

1. A support band, comprising:
 at least one band segment;
 a first connection end and a second connection end;
 the first and second connection ends each having a generally planar mounting surface with a wedge end, a generally planar wedge surface extending from the wedge end forming an acute angle with respect to the mounting surface, and a generally planar stand-off surface between the mounting surface and proximate a distal end of the wedge surface; the mounting surface, the wedge surface and the stand-off surface each in a separate plane;
 the first and second connection end mounting surfaces coupled to the at least one band segment;
 a wedge member proximate the wedge surfaces; the wedge member having wedge portions dimensioned to engage the wedge surfaces of the first and second connection ends;
 a generally planar support plate proximate the mounting surfaces; and
 a fastener between the wedge member and the support plate, aligned with a longitudinal axis normal to the mounting surfaces;
 the fastener operable to draw the wedge member towards the support plate, the wedge portions engaging the wedge surfaces to bias the first connection end away from the second connection end as the wedge member is drawn towards the support plate.

2. The band of claim 1, wherein the wedge surface, the stand-off surface and a portion of the mounting surface between the stand-off surface and the wedge end form a generally right triangle.

3. The band of claim 1, wherein the at least one band segment is aluminum material.

4. The band of claim 1, wherein the at least one band segment is a plurality of band segments joined together by a plurality of fasteners.

5. The band of claim 1, wherein the at least one band segment has a plurality of holes.

6. The band of claim 5, further including at least one quick connect hanger bracket coupled to the at least one band segment.

7. The band of claim 1, wherein the support plate cradles the first and second connection ends between upturned edges; the upturned edges guiding the first and second connection ends along a longitudinal axis of the at least one band segments.

8. A support band kit, comprising:
 a plurality of band segments;
 a first connection end and a second connection end connectable to the band segments;
 the first and second connection ends having a mounting surface with a wedge end;
 a wedge surface extending from the wedge end over the mounting surface at an acute angle and a stand-off surface between the mounting surface and proximate a distal end of the wedge surface; a compression holes in the wedge surfaces and the stand-off surfaces;
 a compression member dimensioned to pass through the compression holes;
 a wedge member having wedge portions;
 a support plate; and
 a fastener between the wedge member and the support plate;
 the support plate mountable proximate the mounting surfaces and the wedge member mountable proximate the wedge surfaces;
 the fastener operable to draw the wedge member towards the support plate, the wedge portions engaging the wedge surfaces to bias the first connection end away from the second connection end as the wedge member is moved towards the support plate.

9. A support band, comprising:
 at least one band segment;
 a first connection end and a second connection end;
 the first and second connection ends each having a generally planar mounting surface with a wedge end, a generally planar wedge surface extending from the wedge end forming an acute angle with respect to the mounting surface, and a generally planar stand-off surface between the mounting surface and proximate a distal end of the wedge surface; the mounting surface, the wedge surface and the stand-off surface each in a separate plane;

the first and second connection end mounting surfaces coupled to the at least one band segment;

a wedge member proximate the wedge surfaces; the wedge member having wedge portions dimensioned to engage the wedge surfaces of the first and second connection ends;

a generally planar support plate proximate and parallel with the mounting surfaces; and a fastener between the wedge member and the support plate;

the fastener operable to draw the wedge member towards the support plate, the wedge portions engaging the wedge surfaces to bias the first connection end away from the second connection end as the wedge member is drawn towards the support plate.

10. The band of claim 9, wherein the wedge surface, the stand-off surface and a portion of the mounting surface between the stand-off surface and the wedge end form a generally right triangle.

11. The band of claim 9, wherein the support plate cradles the first and second connection ends between upturned edges; the upturned edges guiding the first and second connection ends along a longitudinal axis of the at least one band segments.

12. The band of claim 9, wherein the at least one band segment is a plurality of band segments of aluminum material; the band segments joined together by a plurality of fasteners.

13. The band of claim 9, wherein the at least one band segment has a plurality of holes.

* * * * *